United States Patent
Bishop et al.

(10) Patent No.: US 9,550,110 B2
(45) Date of Patent: Jan. 24, 2017

(54) CASHLESS PLAY SYSTEM

(71) Applicant: NAMCO ENTERTAINMENT INC., Wood Dale, IL (US)

(72) Inventors: David L. Bishop, Barrington, IL (US); John P. Kneip, Chicago, IL (US); Alexander N. Orban, Naperville, IL (US)

(73) Assignee: NAMCO USA INC., Wood Dale, IL (US)

( * ) Notice: Subject to any disclaimer, the term of this patent is extended or adjusted under 35 U.S.C. 154(b) by 312 days.

(21) Appl. No.: 13/793,516

(22) Filed: Mar. 11, 2013

(65) Prior Publication Data

US 2014/0256421 A1    Sep. 11, 2014

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/30 | (2014.01) |
| A63F 13/792 | (2014.01) |
| A63F 13/352 | (2014.01) |
| A63F 13/71 | (2014.01) |
| G07F 17/32 | (2006.01) |

(52) U.S. Cl.
CPC ............ *A63F 13/12* (2013.01); *A63F 13/352* (2014.09); *A63F 13/71* (2014.09); *A63F 13/792* (2014.09); *G07F 17/3237* (2013.01)

(58) Field of Classification Search
CPC ............ G07F 17/3202; G07F 17/3225; G07F 17/3239; G07F 17/3227
USPC ......................................................... 463/16
See application file for complete search history.

(56) References Cited

U.S. PATENT DOCUMENTS

| | | | |
|---|---|---|---|
| 6,577,733 B1 | 6/2003 | Charrin | |
| 7,549,576 B2 * | 6/2009 | Alderucci et al. | ............ 235/380 |
| 7,644,861 B2 | 1/2010 | Alderucci et al. | |

(Continued)

FOREIGN PATENT DOCUMENTS

| | | |
|---|---|---|
| KR | 10-2002-0057865 A | 7/2002 |
| WO | WO-97-38366 A1 | 10/1997 |

OTHER PUBLICATIONS

Resorts and Cruise Ships, http://www.corecashless.com/industry-solutions/resorts-and-cruise-ships/, retrieved from the internet on Oct. 23, 2013, 4 pages.

(Continued)

*Primary Examiner* — Kang Hu
*Assistant Examiner* — Jason Pinheiro
(74) *Attorney, Agent, or Firm* — Marshall, Gerstein & Borun LLP; Randall G. Rueth (57) ABSTRACT

A cashless play system for arcade games on passenger ships utilizes a key card reader to read patron identity information. The key card reader sends the patron identity information to a shipboard game play server and receives game play authorization information based on the patron identity information and patron data stored in a shipboard patron database. The key card reader activates the arcade game based on the game play authorization information and causes game play data to be stored in a game play database. Further, the game play server uploads game play data to a remote server, at a geographic location other than the geographic location of the passenger ship, and downloads game play server updates.

20 Claims, 3 Drawing Sheets

(56) References Cited

U.S. PATENT DOCUMENTS

| | | | |
|---|---|---|---|
| 2004/0166940 A1* | 8/2004 | Rothschild | G07F 17/3234 463/42 |
| 2007/0017229 A1 | 1/2007 | Shim | |
| 2007/0155507 A1* | 7/2007 | Gatto et al. | 463/42 |
| 2007/0167229 A1* | 7/2007 | LeMay et al. | 463/29 |
| 2014/0080578 A1* | 3/2014 | Nguyen | 463/25 |

OTHER PUBLICATIONS

Precision Dynamics' Smart Band® RFID Wristband System to be Implemented at First Complete, http://www.pdcorp.com/press-releases/pr2007-IAAPA-conference-rfidvip.html, Nov. 9, 2007, 6 pages.

International Search Report for International Patent Application No. PCT/US2013/053187 dated Nov. 27, 2013.

Written Opinion for International Patent Application No. PCT/US2013/053187 dated Nov. 27, 2013.

International Preliminary Report on Patentability for corresponding international application No. PCT/US2013/053187, Jun. 25, 2015.

\* cited by examiner

CASHLESS PLAY SYSTEM

TECHNICAL FIELD

The present disclosure generally relates to entertainment machines and, more particularly, to the cashless play of arcade games on passenger ships.

BACKGROUND

Arcade game operators prefer to install arcade games, such as video games, pinball games, redemption games, claw cranes, etc., in locations where people may be localized for long periods of time, such as hotels, restaurants, shopping centers, and other public places. In particular, cruise ships are suitable locations for arcade games. Often passengers on cruise ships are domicile on the cruise ship for days at a time giving the passengers frequent opportunities to utilize arcade games.

However, maintaining a network of arcade games on cruise ships presents various difficulties to the operator of the arcade games. The operator must process payments for games, repair broken games, and change game pricing while the cruise ship is in port, and often cruise ships are only in port for a matter of hours. The operator may not be able to accommodate such a tight time schedule, and the operator has no opportunity to view game play statistics, transaction information, and game errors while the ship is at sea. Moreover, passengers on cruise ships often use a room or account key card to make shipboard purchases. As such, passenger may lack the cash needed to play arcade games or it is not immediately convenient to activate a game.

SUMMARY

In one embodiment, a cashless play system for an arcade game on a passenger ship comprises one or more tangible, non-transitory computer readable storage devices. Further, the cashless play system comprises a game play server, located on the passenger ship, configured to receive, via a communication link, patron identity information from a network access point, send, via the communication link, the patron identity information to a server owned by a third party, the server owned by a third party being a third party server, receive authorization information, based on the patron identity information, from the third party server, and send, via a communication link at the game play server, the authorization information to the network access point. The game play server is further configured to cause game play data to be stored on the one or more tangible, non-transitory computer readable storage devices, where the game play data includes transaction information indicating monetary charges for activating the arcade game associated with the patron identity information. The game play data is accessible by the game play server and the third party server. The game play server is configured to periodically upload, via a satellite communication link, game play data to a remote server while the passenger ship is at sea, the remote server being at a geographic location other than the geographic location of the passenger ship, and periodically download, via the satellite communication link, game play server updates from the remote server while the passenger ship is at sea, the game play server updates being based on the game play data.

The cashless play system further comprises a key card reader, at the arcade game. The key card reader is adapted to receive information indicative of one or more passengers on the passenger ship, the information indicative of one or more passengers on the passenger ship being patron identity information, send, via a communication link at the key card reader, the patron identity information to the network access point, and receive, via the communication link, game play authorization information based on the patron identity information from the network access point. The key card reader is adapted to activate the arcade game based on the game play authorization information being a positive activation indication, or not activate the arcade game based on the game play authorization information being a negative activation indication.

In another embodiment, a method for cashless play of an arcade game on a passenger ship comprises receiving, at a key card reader, information indicative of one or more passengers on the passenger ship, the information indicative of one or more passengers on the passenger ship being patron identity information, sending, via a communication link at the key card reader, the patron identity information to a network access point, and sending, via a communication link at the network access point, the patron identity information to a game play server located on the passenger ship. Further, the method comprises receiving game play authorization from the game play server, the game play authorization being based on the patron identity information and at least one of: (i) activating the arcade game, by the key card reader, based on the game play authorization information being a positive activation indication; or (ii) not activating the arcade game, by the key card reader, based on the game play authorization information being a negative activation indication. The method further comprises causing game play data to be stored in a game play database, where the game play data includes transaction information indicating monetary charges for activating the arcade game associated with the patron identity information. The game play data being accessible by the game play server and a server owned by a third party. The method further comprises synchronizing, via a satellite communication link, the game play server with a remote server at a geographic location other than the geographic location of the passenger ship. The synchronizing includes uploading the game play data to the remote server on a periodic basis while the passenger ship is at sea and downloading game play server updates on a periodic basis while the passenger ship is at sea, the game play server updates being based on the game play data.

DETAILED DESCRIPTION

Although the following text sets forth a detailed description of numerous different embodiments, it should be understood that the legal scope of the description is defined by the words of the claims set forth at the end of this disclosure.

The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term 'hd ___________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
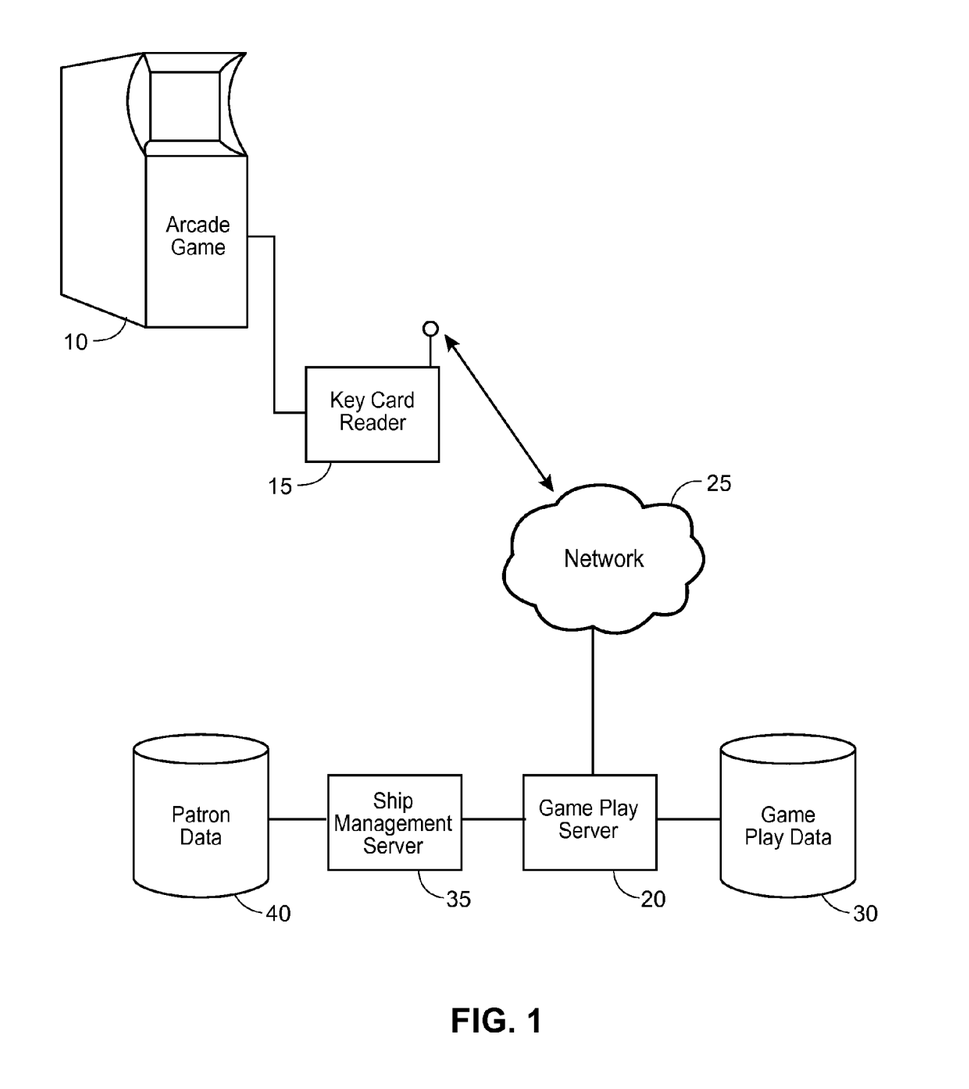
FIG. 1 illustrates an example cashless play system for an arcade game.

FIG. 1 illustrates an example cashless play system for an arcade game 10 on a passenger ship, such as a cruise ship. The arcade game 10 is communicatively coupled to a key card reader 15, described in detail with reference to FIG. 2, via a wired connection such as a coaxial cable, optical fiber cable, or twisted pair cable, for example. The key card reader 15 is adapted to read patron identity information stored on patron key cards, the patron key cards being issued to the passengers and crew of the passenger ship for access to personal cabins or other portions of the ship. The key cards, and the corresponding key card reader 15, may be of any type known in the industry such as magnetic strip, radio frequency identification (RFID), bar code, and quick response (QR) code, for example. In some embodiments, the patron key cards are exclusively for facilitating shipboard purchases and/or arcade game play, not for access to personal cabins or other portions of the ship.

The patron identity information stored on the key cards provides an indication of one or more passengers on the ship. For example, the occupants of a particular cabin on the ship may be issued key cards allowing them access to the cabin and allowing them to charge shipboard purchases to a cabin charge account. When the key card reader 15 reads the key card, the generated patron identity information may include an identification number or code, for example, corresponding to these occupants. Using the patron identity information, the operator of the passenger ship retrieves balances of the cabin accounts, ages of the cabin occupants, names of cabin occupants, etc.

For cashless play of the arcade game 10, a passenger provides patron identify information to the key card reader 15 via a key card. The key card reader 15 sends the patron identity information to a game play server 20 via one or more wireless interfaces (not shown), a wireless access point (not shown) and a network cloud 25. The wireless interfaces may be any interface appropriate for the purpose including, by way of example and without limitation, IEEE 802.11a/b/g/n/ac, mobile telephony, etc. Alternatively, in an embodiment, the key card reader 15 sends the patron identity information to a game play server 20 via one or more wired interfaces, such as coaxial cables, twisted pair wires, etc.

Upon receiving the patron identity information, the game play server records an indication of the attempt to play the arcade game 10 in a game play database 30 on computer-readable storage media that can include both volatile and nonvolatile memory components. In some embodiments, the game play database 30 also includes information regarding the status of the arcade game 10 (e.g. active, broken, etc.) and game pricing information (e.g. $0.50 per game play). Correcting game play errors, or otherwise broken arcade games, is further discussed below with regard to FIG. 3.

The game play server 20 relays the patron identity information to a ship management server 35 via a wired or wireless communication link. The ship management server 35 is a third party server, such as a server owned a cruise line operating the passenger ship or by a hired cruise line contractor, that uses the patron identity information to authorize or deny game play for the one or more passengers corresponding to the patron identity information. For example, the ship management server 35 may use the patron identity information to access a credit account stored in the patron database 40 and associated with the passenger attempting to play the arcade game 10. In some embodiments, the credit account is used to accumulate patron charges, such as shipboard purchases, for example, made during the duration of the passenger ship voyage, where the patron pays for the accumulated charges at the end of the voyage. Based on the balance of that credit account, the ship management server 35 may authorize or deny game play. In some embodiments, the ship management server may consider multiple factors in authorizing game play, such as account balance, age of patrons, time of day, geographic location of the ship, etc.

If game play is authorized by the ship management server, an indication of the authorized game play is sent to the game play server 20. Upon receiving the indication of authorized game play, the game play server 20 records an indication of the authorization in the game play database 30 along with a charge associated with that game play. For example, the game play server 20 may create a record in the game play database 30 indicating that "Passenger #147" is charged 11.50" for playing "Game #4." In some embodiments, the game play server 20 may store additional transaction details in the game play database 30, such as transaction times and part or all of the patron identity information.

Further, the game play server 20 relays the game play authorization information to the key card reader 15. The key card reader activates the arcade game 10 upon receiving game play authorization information indicating authorized game play, and the one or more passengers corresponding to the patron identity information may then play the arcade game 10. Thus, the arcade game is activated without the need for the passenger to carry cash. The passengers need only to carry a key card, where the key card is already in use for access to cabins and for making shipboard purchases, for example. As noted above, the patron key cards, in some embodiments, are exclusively for facilitating shipboard purchases and/or arcade game play.

If game play is denied by the ship management server, an indication of the denial of game play is sent to the game play server 20. Upon receiving the indication of denial, the game play server 20 records an indication of the denial in the game play database 30. Further, the game play server 20 relays the game play denial information to the key card reader 15, and the key card reader may provide an indication of the game play denial to the passenger(s) attempting to initiate game play. For example, the key card reader may provide an indication of insufficient funds in the account associated with the patron identity information.

In some embodiments, a loyalty or redemption program may be integrated with the cashless play system, such as the cashless play system illustrated in FIG. 1. For example, a cruise line operating the passenger ship may utilize a loyalty program to encourage passengers to purchase shipboard services or products. This program may be based on points, where a passenger may receive one-hundred points for purchasing spa services, fifty points for eating at a certain restaurant, etc. When the passenger receives a specific number of points, the passenger is rewarded with a prize or coupon for further service (e.g. a free drink or a buy one drink get one free coupon), for example.

Since the cashless play system of the current disclosure, such as the cashless play system illustrated in FIG. 1, is integrated with the ship key card system, arcade games may be integrated into the loyalty or redemption program. For example, passengers may receive a specific number of points for playing an arcade game, and these points may be added to any existing loyalty points received for purchasing other shipboard services and products. The points may be added to the account of a passenger when the patron identity information is sent from a key card reader at the arcade game to a ship management server, such as the ship management server 35, via a game play server, such as the game play server 20.

Further, the techniques of the present disclosure are utilized, in some embodiments, to provide cashless activation of devices other than arcade games. For example, key card readers at vending machines, access control devices (e.g. turnstiles controlling entry to areas of the passenger ship requiring a fee), motion-based simulator rides, etc. may activate respective devices based on authorization information from a game play server, such as game play server 20. Such an integrated system allows the operator of the cruise ship to more easily track and record transactions, corresponding to many different amusement devices, via a centralized cashless activation/game play system.

In an embodiment, one or more of the arcade games on the ship, such as arcade game 10, are redemption games. Redemption games are a type of arcade game that rewards players of the game proportionally to the scores of the players in the game, where the rewards are often in the form of tickets redeemable for prizes (e.g. fifty tickets may be redeemed for a stuffed animal). Similar to the points system discussed above, a shipboard redemption game integrated in the cashless play system may reward the player with points proportional to the score of the player in the game. These points may be redeemed for further game play or for other shipboard services or products. To facilitate such redemption games, the key card reader, such as the key card reader 15 may send indication of player scores to a game play server, such as the game play server 35, in addition to patron identity information.

Figure 2:
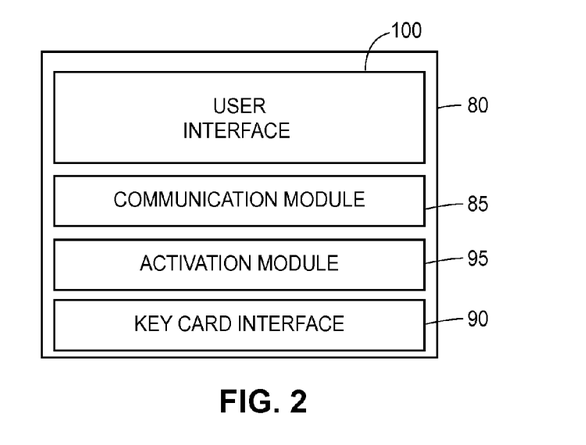
FIG. 2 illustrates an example key card reader than can read patron identity information and activate an arcade game.

FIG. 2 illustrates an example key card reader 80 that can read patron identity information and activate an arcade game. The key card reader 80 includes a communication module 85, where the communication module 85 provides communication to an arcade game, such as the arcade game 10, and a game play server, such as the game play server 20, as discussed above.

The key card reader 80 also includes a key card interface 90. The key card interface 90 may be any appropriate key card interface corresponding to the type of key cards used by ship passengers. For example, if ship passengers are issued RFID key cards, the key card interface 90 may include appropriate radio signal sensors and processing routines to read the RFID key card, or if ship passengers are issued magnetic strip key cards, the key card interface 90 may include a slot into which key cards may be inserted or swiped.

The key card reader 80 transfers patron identity information read from patron key cards to the communication module 85, and, in turn, the communication module 85 sends the patron identity information to a game play server, such as the game play server 20. As discussed above, the game play server, may, after communicating with a ship management server, send game play authorization information back to the key card reader 80.

Upon receiving game play authorization information indicating authorized game play, the activation module 95 generates an activation signal for the arcade game. The activation signal is sent, via the communication module 85, to the arcade game to activate the arcade game. The activation signal may be a digital or analog signal. In some embodiments, the activation signal includes game specific information, such as allotted length of time for game play, for example, which may be changeable based on the patron. If the game play authorization information includes an indication of denied game play, the key card reader 80 may forward this indication of denial to the user via one or more lights, one or more sounds, or via a user interface, discussed below.

The example key card reader 80 also includes a user interface 100. The user interface may include a touchscreen, LED display, keyboard, one or more buttons or toggles, and/or any other appropriate devices commonly used in the industry. Upon receiving authorization information from a game play server, the user interface 100 may display an indication of game play authorization to the passenger, such that the passenger is aware of the game play authorization. Further, the user interface 100 may display other relevant information such as charges associated with the game play, length of time allotted for the game play (e.g. in the form of a timer), or loyalty points earned for the game play, for example.

In some embodiments, passengers manually enter patron identity information via the user interface 100. Some cruise lines may issue passengers a personal identification number (PIN). The passengers may enter the PIN at the key card reader, via a keyboard, for example, to provide patron identity information, as opposed to using a key card. Alternatively, passengers may manually enter specific identification information, such as name, age, cabin number, etc., in cases where a key card has been lost or key cards are not issued, for example. In some embodiments, the PIN numbers and/or specific identification information is exclusively for facilitating shipboard purchases and/or arcade game play, not for access to personal shipboard cabins.

Therefore, an arcade game, such as the arcade game 10, may be activated with a cashless pay system onboard the passenger ship. This cashless play system provides an easy and intuitive customer experience and allows the integration of cruise line loyalty and redemption programs. However, it is additionally desirable for the operator of a network of arcade games to access transaction information, game play statistics, game errors, etc. and update pricing information, arcade game operating systems, etc. while the passenger ship is at sea.

Figure 3:
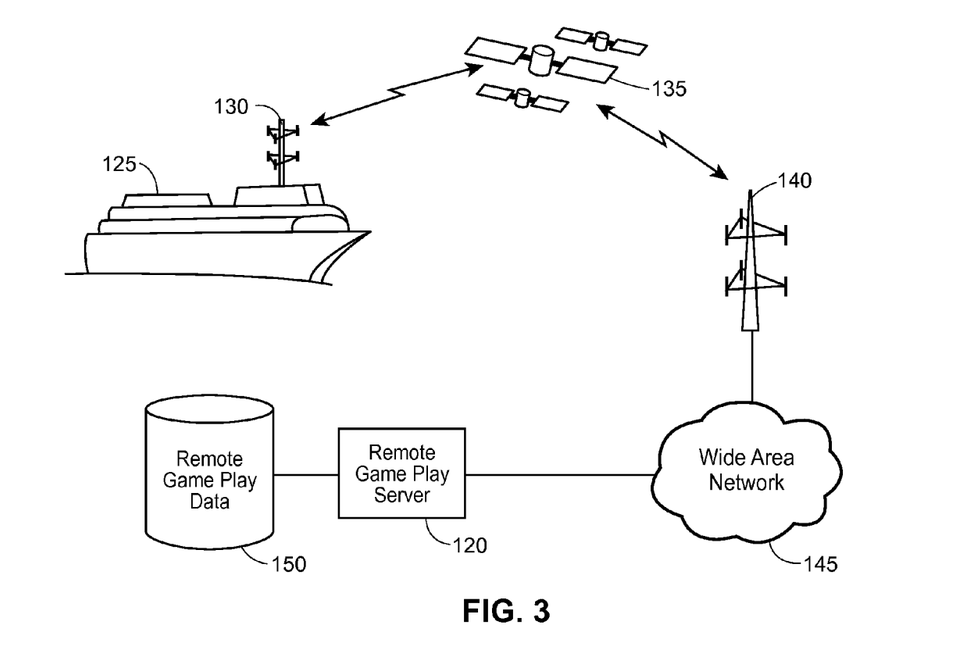
FIG. 3 illustrates an example system in which a game play server and remote server may be synchronized.

FIG. 3 illustrates an example system in which game play data may be uploaded to a remote game play server 120 and game play server updates may be downloaded to a game play server, such as the game play server 20. The passenger ship 125 is communicatively coupled via one or more satellite communication links 130, one or more satellites 135, and antenna 140 to a wide area network 145. The wide area network may be the internet, for example. In some embodiments, the passenger ship 125 may maintain a constant connection to the wide area network 145, and in other embodiments, the passenger ship 125 may only connect to the wide area network at specific times (e.g. once per hour or once per day).

A game play server, such as the game play server 20, on the passenger ship 125 manages the game play of one or more arcade games, such as the arcade game 10. Over time, the game play server accumulates game play data in a game play database, such as the game play database 30, and periodically uploads the game play data to the remote game play server 120 while the passenger ship is at sea, via the satellite connection of the passenger ship 125. In some embodiments, the game play server 20 uploads only relevant portions of the game play data in the game play database. In another implementation, the game play data may include error messages, game play statistics, and player scores from the arcade game.

Upon receiving the game play data from the shipboard game play server, the remote game play server 120 records the game play data in a remote game play database on computer-readable storage media that can include both volatile and nonvolatile memory components. In this way, the game play data has mirrored copies on a shipboard database (e.g. the game play database 30) and a remote game play database 150. If the shipboard database or corresponding server fails while at sea, the game play data is safely mirrored in the remote game play database 150 and transaction information is not permanently lost. When the shipboard database or server is restored, the game play data may be restored, via download from the remote game play server 120. Further, the mirrored copies of game play data may be compared in an audit process to verify data indicating monetary charges for game play.

In addition to storing the game play data, the remote game play server 120 develops game play server updates for the shipboard game play server based on the uploaded game play data. For example, if few people are playing certain arcade games, the pricing for those arcade games may be reduced to encourage more frequent game play, and these pricing changes may be implemented in the form of game play server updates sent from the remote game play server 120 to the shipboard game play server. In some embodiments, game play server updates may include pricing changes based on geographic locations of the passenger ship. For example, the pricing of an arcade game may change based on a passenger ship location change from the Caribbean islands to New York City.

Further, if error messages are uploaded from a shipboard game play server to the remote game play server 120, the remote game play server 120 may forward an indication of the error messages to the operator of the arcade games. For example, the remote game play server may cause an email or text message alert to be sent to the operator of the arcade game notifying the operator of faulty machines. By forwarding an indication of errors on shipboard arcade games, the operator may arrange to have replacement parts, appropriate technicians, etc., ready for the arcade game when the ship is in port.

Figure 4:
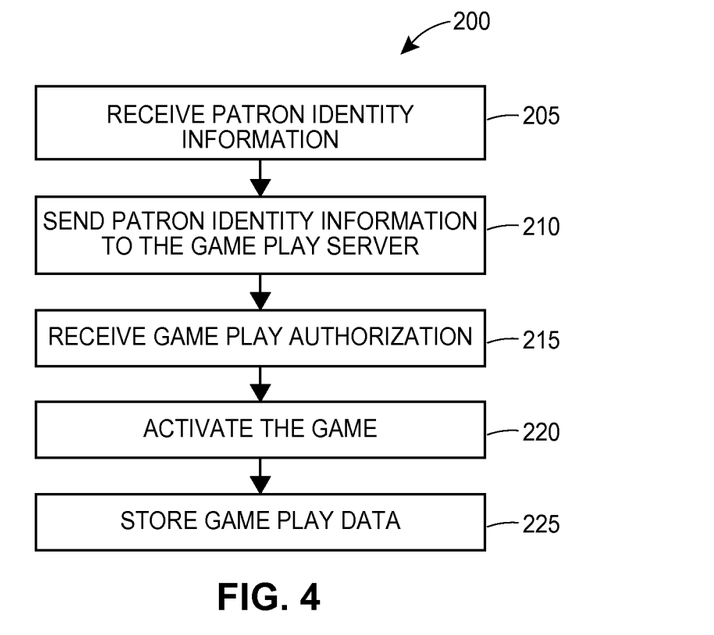
FIG. 4 is a flow chart of an example method for cashless play of an arcade game.

FIG. 4 is a flow chart of an example method 200 for cashless play of an arcade game on a passenger ship. The example method 200 may be implemented in the cashless play system illustrated in FIG. 1, for example.

The method 200 may begin when patron identity information is received via a key card reader, such as the key card reader 15 (block 205). The patron identity information may include information indicative of one or more passengers or crew on the passenger ship. In some embodiments, the patron identity information corresponds to one or more passengers sharing a single cabin on the ship, such as a family. In other embodiments, the patron identity information corresponds to a single passenger or member of the crew on the passenger ship.

The patron identity information is sent, via one or more wireless interfaces at the key card reader, to a game play server (block 210). In some embodiments, a timestamp is sent with the patron identity information to provide an indication of the time at which the patron attempts to play the arcade game. The timestamp may be stored with corresponding charges associated with the play of the arcade game. The game play server forwards the patron identity information to one or more ship management servers, such as the ship management server 35, for game play authorization based on the patron identity information. If the game play server receives authorization information from the one or more ship management servers, the game play server forwards the authorization information to the key card reader.

The key card reader then receives authorization information from the game play server (block 215). The authorization information may include an authorization for game play for a fixed period of time (e.g. five minutes) or for a standard turn as defined by the arcade game (e.g. one change to grab a prize with a claw), for example.

Next, the key card reader activates the arcade game based on the authorization information (block 220). The activation of the arcade game may include an analog or digital signal transmitted from the key card reader to the arcade game. In some embodiments, the key card reader provides an indication of game play authorization to the passenger via a user interface at the key card reader. The indication of game play authorization may include an indication that the game is ready to be played along with a price that has been charged to the account of the passenger, for example. In some embodiments, the key card reader user interface may include a button that is activated by the authorization information, where the passenger selects the button to initiate game play.

Game play data associated with the patron identity information is stored in a game play database, such as the game play database 30 (block 225). The stored game play data includes at least a charge associated with the game play. In some embodiments, the game play data also includes all or part of the patron identity information. In some other embodiments, the game play data further includes game play statistics, such as length of game play, player scores, arcade game errors, etc. The game play statistics and patron identity information may be integrated into a shipboard loyalty/redemption program or used by the arcade game operator for management purposes, for example.

Figure 5:
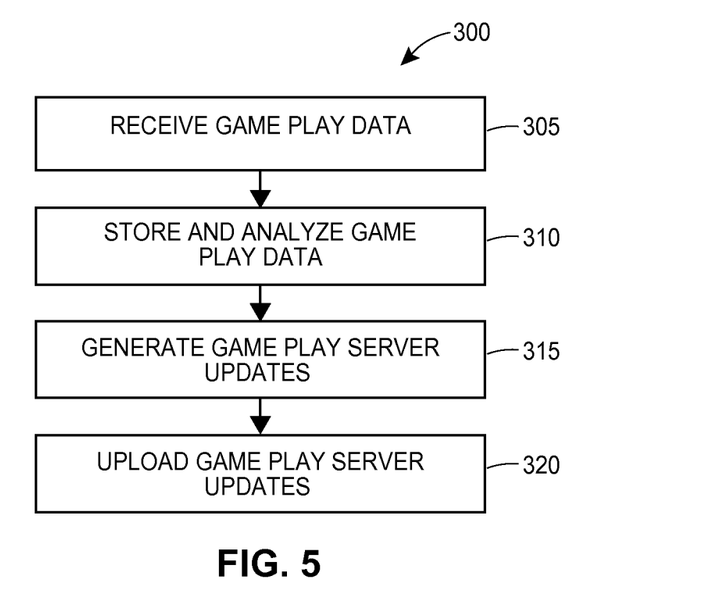
FIG. 5 is a flow chart of an example method for synchronizing a shipboard game play server and a remote game play server.

FIG. 5 is a flow diagram of an example method 300 for synchronizing a shipboard game play server and a remote game play server. The method may be implemented in the system illustrated in FIG. 3, for example.

A remote game play server, located in a geographic location other than the geographic location of the passenger ship, receives game play data from a shipboard game play server (block 305). The game play data is transmitted via a shipboard satellite connection, or other appropriate communicative connection. In some embodiments, the remote game play server may receive game play data from a network of game play servers located on multiple passenger ships with one or more arcade games on the respective ships.

Next, the remote game play server stores the game play data in a remote game play database also at a location other than the location of the passenger ship (block 310). At block 315, the remote game play server develops game play server updates for the game play servers on the one or more passenger ships. In some embodiments, the game play server updates include pricing update information based on the uploaded game play data. For example, the remote game play server may analyze the game play frequency or daily profits from an arcade game on one or more passenger ships and determine, based on the game play frequency and profits, an appropriate change in pricing for that arcade game. The change in pricing may be reflected in the game play server updates. In another embodiment, the game play server updates include updates to an arcade game operating system. A glitch in the operating system of certain video arcade games may be known, via error messages from shipboard arcade games or otherwise, and the remote game play server may develop game play server updates that include appropriate fixes to the game operating system, for example.

Game play server updates are then sent from the remote game play server to the shipboard game play server via a satellite communication link, or other appropriate communication link (block 320). In some embodiments, the remote game play server uploads multiple updates, such as a pricing update, a game error update, etc., concurrently or at separate times.

We claim:

1. A cashless play system for an arcade game on a passenger ship comprising:
   one or more tangible, non-transitory computer readable storage devices;
   a game play server, located on the passenger ship, configured to:
   receive, via a communication link, patron identity information from a network access point coupled to a key card reader,
   send, via the communication link, the patron identity information to a third party server owned by a third party different than an owner of the game play server,
   receive authorization information, based on the patron identity information, from the third party server,
   forward, via the communication link, the authorization information to the key card reader via the network access point,
   generate game play data to be stored on the one or more tangible, non-transitory computer readable storage devices,
   the game play data including (i) transaction information indicating monetary charges for activating the arcade game associated with the patron identity information, and (ii) a game play frequency for the arcade game,
   the game play data being accessible by the game play server and the third party server,
   upload, via a satellite communication link, the game play data to a remote server while the passenger ship is at sea, the remote server being at a remote geographic location other than a geographic location of the passenger ship, the remote server configured to analyze (i) the game play frequency included in the game play data and (ii) the geographic location of the passenger ship to determine a pricing change for the arcade game,
   download, via the satellite communication link, game play server updates from the remote server while the passenger ship is at sea, the game play server updates reflecting the pricing change for the arcade game, and
   update the arcade game according to the pricing change; and
   the key card reader, at the arcade game, adapted to:
   read a key card to identify information indicative of one or more passengers on the passenger ship, the information indicative of the one or more passengers on the passenger ship being patron identity information,
   send, via a communication link at the key card reader, the patron identity information to the game play server via the network access point,
   receive, via the communication link, game play authorization information based on the patron identity information from the network access point, and
   activate the arcade game based on the game play authorization information being a positive activation indication, or
   not activate the arcade game based on the game play authorization information being a negative activation indication.

2. The system of claim 1, wherein the key card reader reads key cards issued to passengers on the passenger ship, the key cards allowing the passengers access to rooms on the passenger ship.

3. The system of claim 1, wherein the key card reader reads key cards issued to passengers on the passenger ship, the key cards allowing passengers to make purchases of services and products offered by an operator of the passenger ship.

4. The system of claim 1, wherein the game play server uploads the game play data and downloads the game play server updates at periodic times when the satellite communication link is available.

5. The system of claim 1, wherein the key card reader is a magnetic strip key card reader.

6. The system of claim 1, wherein the key card reader is an Radio Frequency Identification (RFID) key card reader.

7. The system of claim 1, wherein the game play data further includes an indication of at least one of:
   (i) a time corresponding to an authorization of passenger account charges,
   (ii) passenger game scores,
   (iii) arcade game errors, or
   (iv) loyalty points.

8. The system of claim 7, wherein the loyalty points are generated by game play corresponding to the patron identity information.

9. The system of claim 8, wherein the loyalty points are redeemable for at least one of:
   (i) further game play associated with the patron identity information, or
   (ii) other services or products offered for sale on the passenger ship.

10. The system of claim 1, wherein the arcade game is an entertainment machine, not a game of chance.

11. The system of claim 1, further comprising an integrated key card reader, at an integrated device, adapted to:
    receive information indicative of one or more passengers on the passenger ship, the information indicative of the one or more passengers on the passenger ship being patron identity information,
    send, via a communication link at the key card reader, the patron identity information to the network access point, receive, via the communication link, integrated device authorization information based on the patron identity information from the network access point, and activate the integrated device based on the integrated device authorization information being a positive activation indication, or not activate the integrated device based on the integrated device authorization information being a negative activation indication.

12. The system of claim 11, wherein the integrated device includes at least one of:
(i) a product vending machine,
(ii) a device granting access to one or more areas of the passenger ship based on a monetary charge, or
(iii) a motion simulated amusement device.

13. A method for cashless play of an arcade game on a passenger ship, the method comprising:

reading, at a key card reader, a key card to identify information indicative of one or more passengers on the passenger ship, the information indicative of the one or more passengers on the passenger ship being patron identity information;

sending, via a first communication link at the key card reader, the patron identity information to a network access point;

sending, via a second communication link at the network access point, the patron identity information to a game play server located on the passenger ship;

receiving game play authorization information from the game play server, the game play authorization information being based on the patron identity information;

at least one of:
(i) activating the arcade game, by the key card reader, based on the game play authorization information being a positive activation indication, or
(ii) not activating the arcade game, by the key card reader, based on the game play authorization information being a negative activation indication;

causing game play data to be stored in a game play database, the game play data including (i) transaction information indicating monetary charges for activating the arcade game associated with the patron identity information, and (ii) a game play frequency for the arcade game, the game play data being accessible by the game play server and a server owned by a third party; and synchronizing, via a satellite communication link, the game play server with a remote server at a remote geographic location other than a geographic location of the passenger ship, the synchronizing including:

uploading the game play data to the remote server while the passenger ship is at sea, the remote server configured to analyze (i) the game play frequency included in the game play data and (ii) the geographic location of the passenger ship to determine a pricing change for the arcade game; and downloading game play server updates from the remote server while the passenger ship is at sea, the game play server updates reflecting the pricing change for the arcade game; and updating the arcade game according to the pricing change.

14. The method of claim 13, wherein the patron identity information corresponds to at least one of:
(i) a passenger identification number,
(ii) a name of a passenger,
(iii) a cabin number corresponding to a passenger, or
(iv) an account number corresponding to a passenger.

15. The method of claim 13, wherein the game play authorization information is based on account balances corresponding to the patron identity information, the account balances being prepaid or charged monetary amounts.

16. The method of claim 13, wherein the game play data further includes an indication of at least one of:
(i) a time corresponding to an authorization of passenger account charges,
(ii) passenger game scores,
(iii) arcade game errors, or
(iv) loyalty points.

17. The method of claim 13, wherein the synchronizing occurs at periodic times based on an availability of the satellite communication link.

18. The method of claim 17, wherein the game play data accumulated during any game play occurring after one of the periodic times is uploaded to the remote server at a subsequent periodic time.

19. The method of claim 13, wherein the game play server updates includes at least one of:
(i) video game operating system updates,
(ii) loyalty program changes,
(iii) restoration of lost game play data.

20. The method of claim 13, wherein the pricing change for the arcade game is further based on current or past geographic locations of the passenger ship.

* * * * *